(12) United States Patent
Hemerson (10) Patent No.: US 9,612,179 B2
(45) Date of Patent: Apr. 4, 2017

(54) RESTRAINT DEVICE

(71) Applicant: Albert Hemerson, Gilmore City, IA (US)

(72) Inventor: Albert Hemerson, Gilmore City, IA (US)

( * ) Notice: Subject to any disclaimer, the term of this patent is extended or adjusted under 35 U.S.C. 154(b) by 292 days.

(21) Appl. No.: 14/277,480

(22) Filed: May 14, 2014

(65) Prior Publication Data

US 2015/0330870 A1 Nov. 19, 2015

(51) Int. Cl.
*G01M 17/007* (2006.01)
*B62D 53/08* (2006.01)

(52) U.S. Cl.
CPC ...... *G01M 17/007* (2013.01); *G01M 17/0074* (2013.01); *B62D 53/08* (2013.01)

(58) Field of Classification Search
CPC  B62D 53/08; G01M 17/0074; G01M 17/007; B65G 69/003
USPC .............................. 73/116.01, 116.06, 116.08
See application file for complete search history.

(56) References Cited

U.S. PATENT DOCUMENTS

| | | | |
|---|---|---|---|
| 3,680,368 A * | 8/1972 | Warsaw ..................... | G01L 5/13 73/114.15 |
| 3,905,225 A * | 9/1975 | Moss ........................ | G01L 3/26 73/116.06 |
| 4,047,733 A | 9/1977 | Parkes | |
| 4,708,358 A | 11/1987 | Gehman | |
| 5,076,448 A | 12/1991 | Ballard | |
| 5,845,920 A | 12/1998 | Hill | |
| 5,988,664 A | 11/1999 | Hill | |
| 6,120,051 A | 9/2000 | Lichter | |
| 6,808,194 B2 | 10/2004 | Martin | |
| 7,243,431 B2 * | 7/2007 | Godwin .................... | B60D 1/36 280/477 |
| 7,503,549 B2 | 3/2009 | Maturino | |
| 7,669,255 B2 | 3/2010 | Raney | |
| 7,926,337 B2 * | 4/2011 | Inoue ................ | G01M 17/0074 73/116.01 |
| 8,047,758 B2 * | 11/2011 | Watkins ..................... | B60P 3/07 280/402 |
| 2007/0245831 A1 * | 10/2007 | Betancor Bethencourt .......... | B62D 53/08 73/788 |
| 2007/0290181 A1 | 12/2007 | Bell | |
| 2011/0176896 A1 * | 7/2011 | Andersen ............. | B65G 69/003 414/401 |

FOREIGN PATENT DOCUMENTS

CN        201560072 U    8/2010

* cited by examiner

*Primary Examiner* — Freddie Kirkland, III
(74) *Attorney, Agent, or Firm* — David M. Breiner; BrownWinick Law Firm (57) ABSTRACT

Disclosed is a method of testing a vehicle having a fifth wheel and an apparatus for restraining the vehicle. The method of testing the vehicle may include moving the vehicle on a dynamometer and inserting a coupling structure into the fifth wheel to secure the vehicle during a test. In accordance with example embodiments, the apparatus may include a boom having a pin connection and a connecting structure arranged at an end of the boom, the connecting structure being configured to couple to the fifth wheel of the vehicle.

16 Claims, 14 Drawing Sheets

RESTRAINT DEVICE

BACKGROUND

1. Field

Example embodiments relate to devices for restraining a vehicle, for example, a truck. The devices, for example, may attach to a fifth wheel that may be attached to the vehicle or which is part of the vehicle. The devices may be used, for example, to restrain a vehicle as the vehicle is undergoing a test. Example embodiments also relate to a method of testing a vehicle.

2. Description of the Related Art

Figure 1:
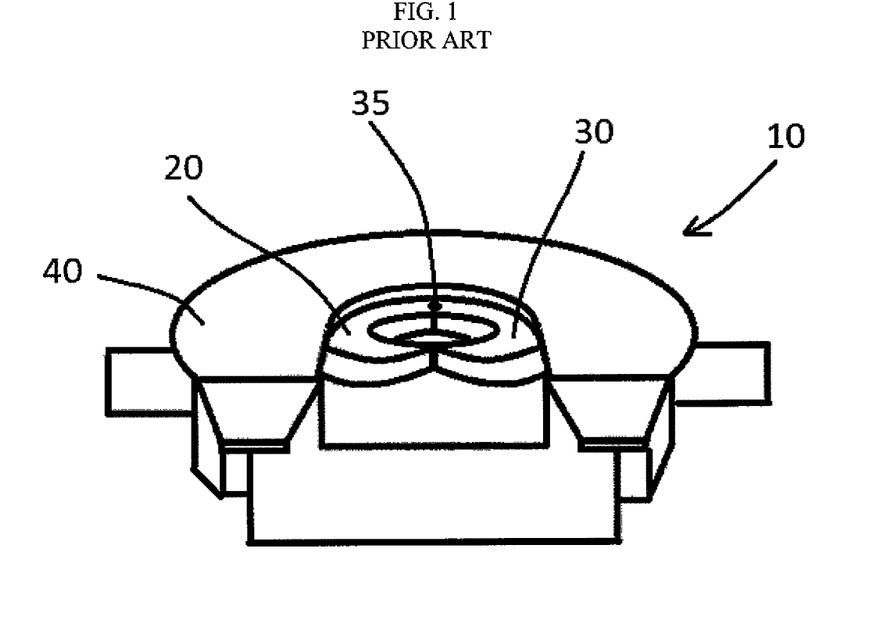
FIG. 1 is a perspective view of a fifth wheel in accordance with the conventional art.
Figure 2:
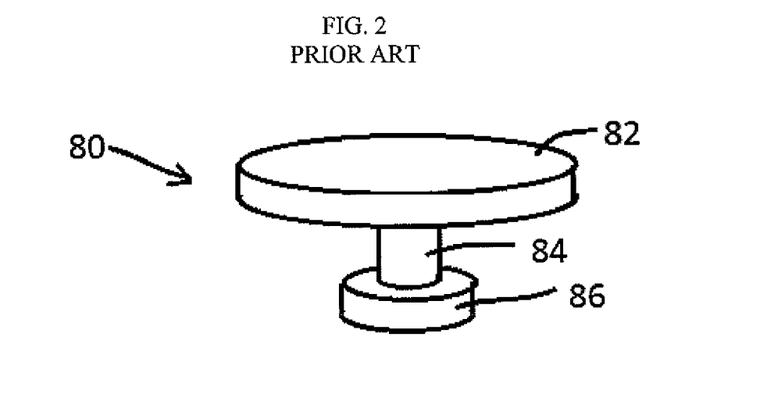
FIG. 2 a perspective view of a kingpin in accordance with the conventional art.

FIG. 1 is a view of a "fifth wheel" 10, a coupling structure commonly found on trucks. FIG. 2 is a view of kingpin 80, another coupling structure commonly found on trailers. The fifth wheel 10 serves as coupling structure to allow a trailer to attach to the truck via the kingpin 80. As shown in FIG. 1, the fifth wheel 10 includes a collar shaped member 40 which encloses a pair of jaws 20 and 30 coupled together by a pin 35. The kingpin 80 generally comprises an upper plate 82, a neck 84, and a lower flange 86. Typically, the jaws 20 and 30 of the fifth wheel 10 are configured to separate as a kingpin 80 from a trailer is inserted therein. For example, in the conventional art, the neck 84 of the kingpin 80 is moved between the jaws 20 and 30 of the fifth wheel 10 to separate the jaws 20 and 30. After the kingpin 80 is inserted into the jaws 20 and 30, the jaws 20 and 30 close capturing the kingpin 80.

Figure 3A:
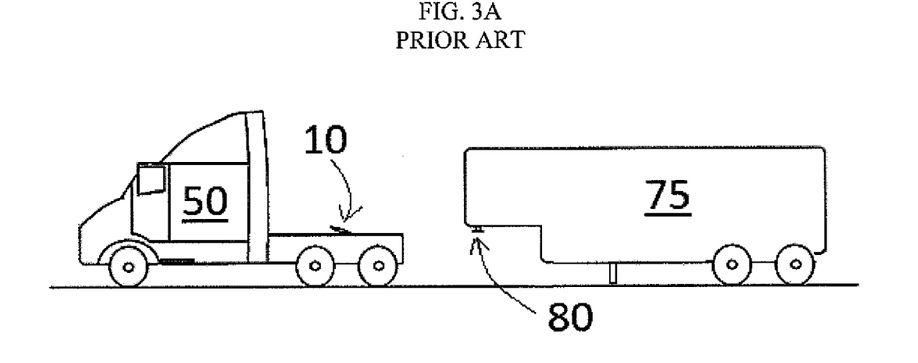
FIGS. 3A-3C illustrate a conventional truck attaching to a conventional trailer.
Figure 3B:
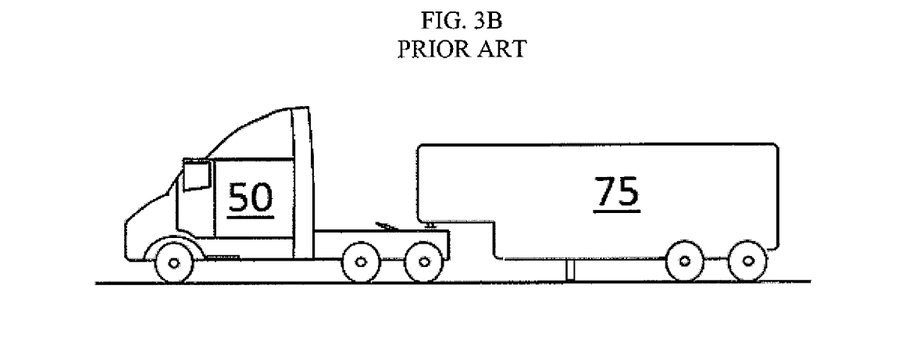
Figure 3C:
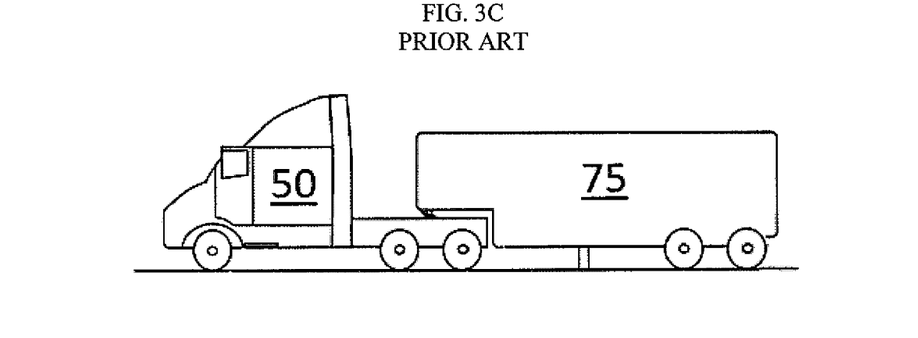

FIGS. 3A-3C illustrate operations associated with coupling a trailer 75 to a truck 50. As shown in FIG. 3A the truck 50 is generally aligned with the trailer 75 and is moved towards the trailer 75 as shown in FIG. 3B. Generally speaking, the truck 50 is moved so that the fifth wheel 10 of the truck 50 is in alignment with a kingpin 80 on the trailer 75. The truck 50 continues to move backwards until the kingpin 80 is captured by the fifth wheel 20 of the truck 50 as shown in FIG. 2C. At this point the truck 50 and trailer 75 are coupled together so that if the truck were to move forward (or backward) the trailer 75 would move with the truck 50.

Figure 4:
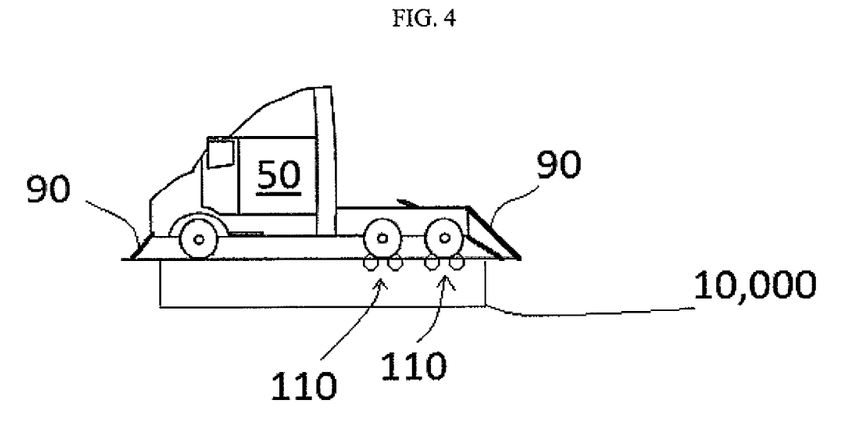
FIG. 4 is a view of a truck strapped to a dynamometer in accordance with the conventional art.

FIG. 4 is a view of the truck 50 on a dynamometer 10,000 (hereinafter dyno 10,000). A dyno 10,000 is a device for measuring torque and/or power. In the conventional art the truck's wheels contact a plurality of rollers 110 associated with the dyno 10,000 and turn the dyno's rollers 110 as the wheels 50 of the truck are rotated (under the influence of the truck's engine).

In the conventional art the truck 50 is held in place by a series of straps and/or chains 90. The straps and/or chains 90 ensure the truck 50 is held in place to prevent the truck 50 from moving off the rollers 110 while the truck's wheels are rotating at a relatively high rate.

SUMMARY

The inventors have noticed that while chains and/or belts do a sufficient job at restraining a truck during a dyno test, the chains and/or belts have several problems. First, the chains and/or belts pose of risk of scratching the truck while they are being attached to the truck and while the dyno test is running. As a consequence, some truck owners choose to remove various parts of their truck before a dyno test is performed and then reattach the parts to the truck shortly thereafter. If parts are not removed from the truck and the parts are scratched by the belts and/or chains, the owner must either repair the scratches, the cost of which may be quite expensive, or simply "live with" the damage. Additionally, attaching the belts and chains to the truck is a relatively time consuming process for a dyno operator. Finally, the inventors note that while chains and/or belts sufficiently restrain the a truck during a dyno test, there is a risk of the belts and/or chains breaking. Given the high rate at which the trucks tires spin during a dyno test, a broken belt and/or chain could have catastrophic results resulting in damage to the dyno, the truck, and potentially causing loss of human life. As such, the inventors have sought to create a device which may more safely restrain a truck during a dyno test without having the other drawbacks associated with chains and/or belts. As a consequence, the inventors have invented a new and nonobvious device configured to restrain a truck during a dyno test. In addition, inventors have also developed a novel and nonobvious method for testing a vehicle using a dyno and their newly developed device.

Example embodiments relate to devices for restraining a vehicle, for example, a truck. The devices, for example, may attach to a fifth wheel that may be attached to the vehicle or which may be a part of the vehicle. The devices may be used, for example, to restrain a vehicle as the vehicle is undergoing a test. Example embodiments also relate to a method of testing a vehicle.

In accordance with example embodiments, a method of testing a truck having a fifth wheel may include moving a truck on a dynamometer and inserting a coupling structure into the fifth wheel to secure the truck during the test.

In accordance with example embodiments, an apparatus may include a boom having a pin connection and a connecting structure arranged at an end of the boom, the connecting structure may be configured to couple to a fifth wheel of a vehicle.

BRIEF DESCRIPTION OF THE DRAWINGS

Example embodiments are described in detail below with reference to the attached drawing figures, wherein.

DETAILED DESCRIPTION

Example embodiments will now be described more fully with reference to the accompanying drawings, in which example embodiments of the invention are shown. The invention may, however, be embodied in different forms and should not be construed as limited to the example embodiments set forth herein. Rather, these example embodiments are provided so that this disclosure will be thorough and complete, and will fully convey the scope of the invention to those skilled in the art. In the drawings, the sizes of components may be exaggerated for clarity.

In this application, it is understood that when an element or layer is referred to as being "on," "attached to," "connected to," or "coupled to" another element or layer, it can be directly on, directly attached to, directly connected to, or directly coupled to the other element or layer or intervening elements that may be present. In contrast, when an element is referred to as being "directly on," "directly attached to," "directly connected to," or "directly coupled to" another element, there are no intervening elements present. As used herein, the term "and/or" includes any and all combinations of one or more of the associated listed items.

In this application it is understood that, although the terms first, second, etc. may be used herein to describe various elements and/or components, these elements and/or components should not be limited by these terms. These terms are only used to distinguish one element, component, region, layer, and/or section from another elements, component, region, layer, and/or section. Thus, a first element, component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to planform views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to devices for restraining a vehicle, for example, a truck. The devices, for example, may attach to a fifth wheel that may be attached to the vehicle or which is part of the vehicle. The devices may be used, for example, to restrain a truck as a truck is undergoing a test. Example embodiments also relate to a method of testing a truck, for example, by using the restraining devices to restrain the vehicle during a dyno test.

Figure 5A:
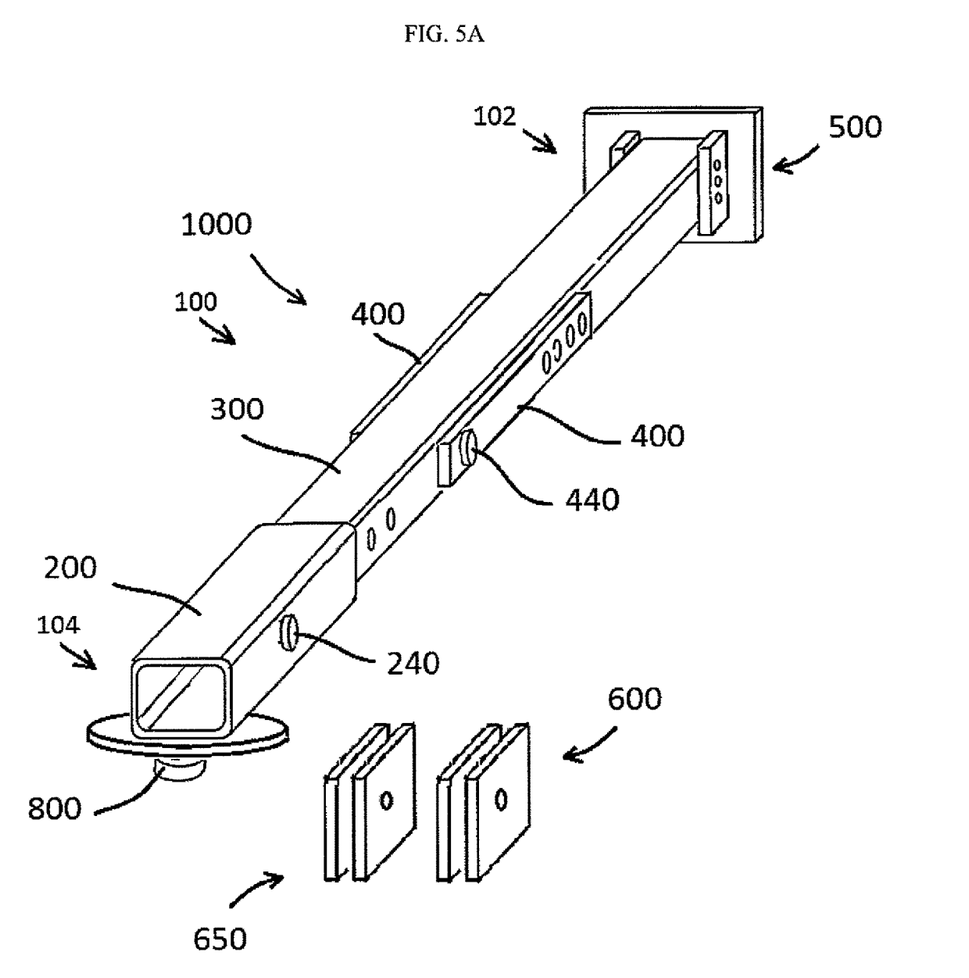
FIGS. 5A and 5B are perspective views of a restraining device in accordance with example embodiments.
Figure 5B:
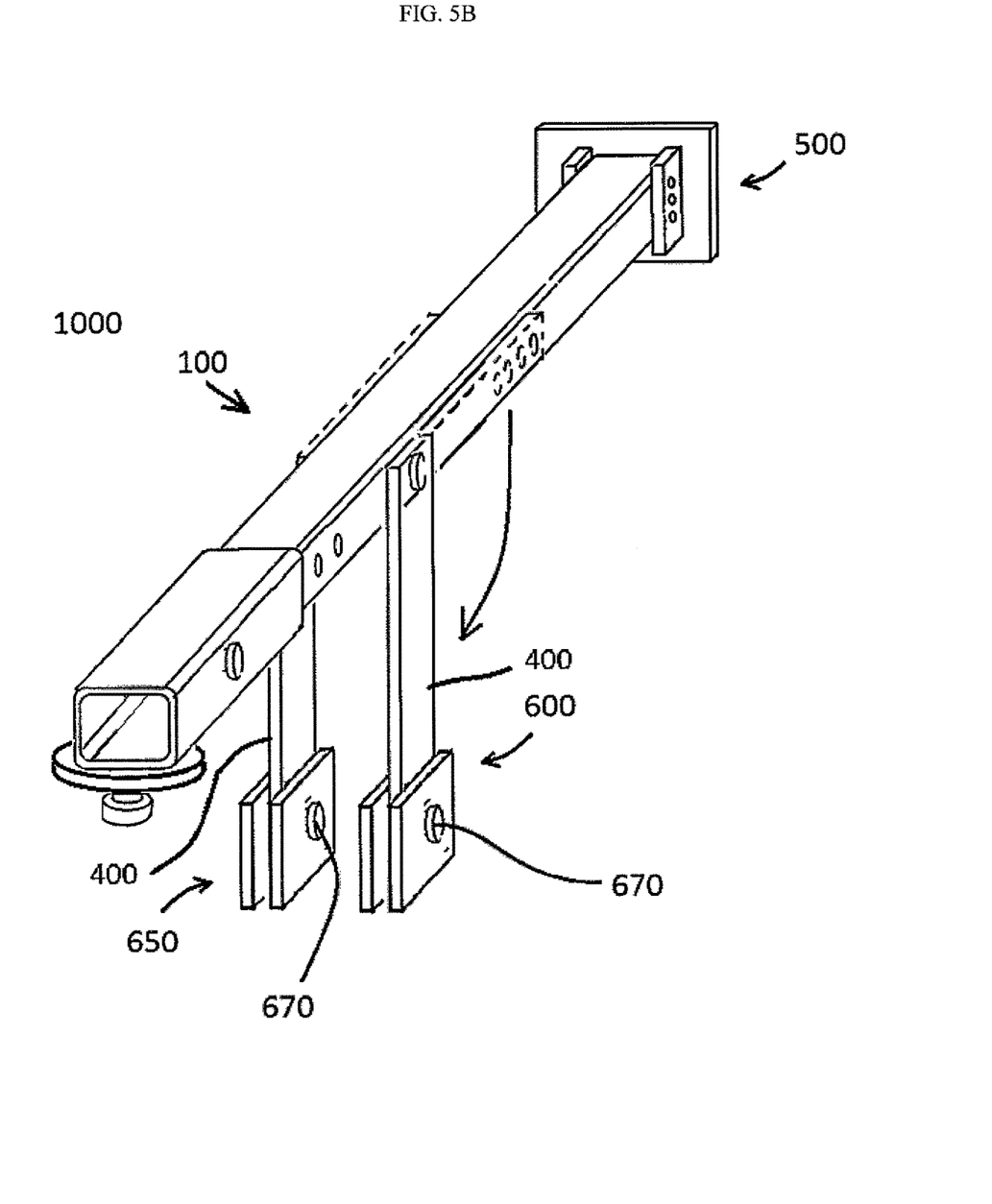
Figure 5C:
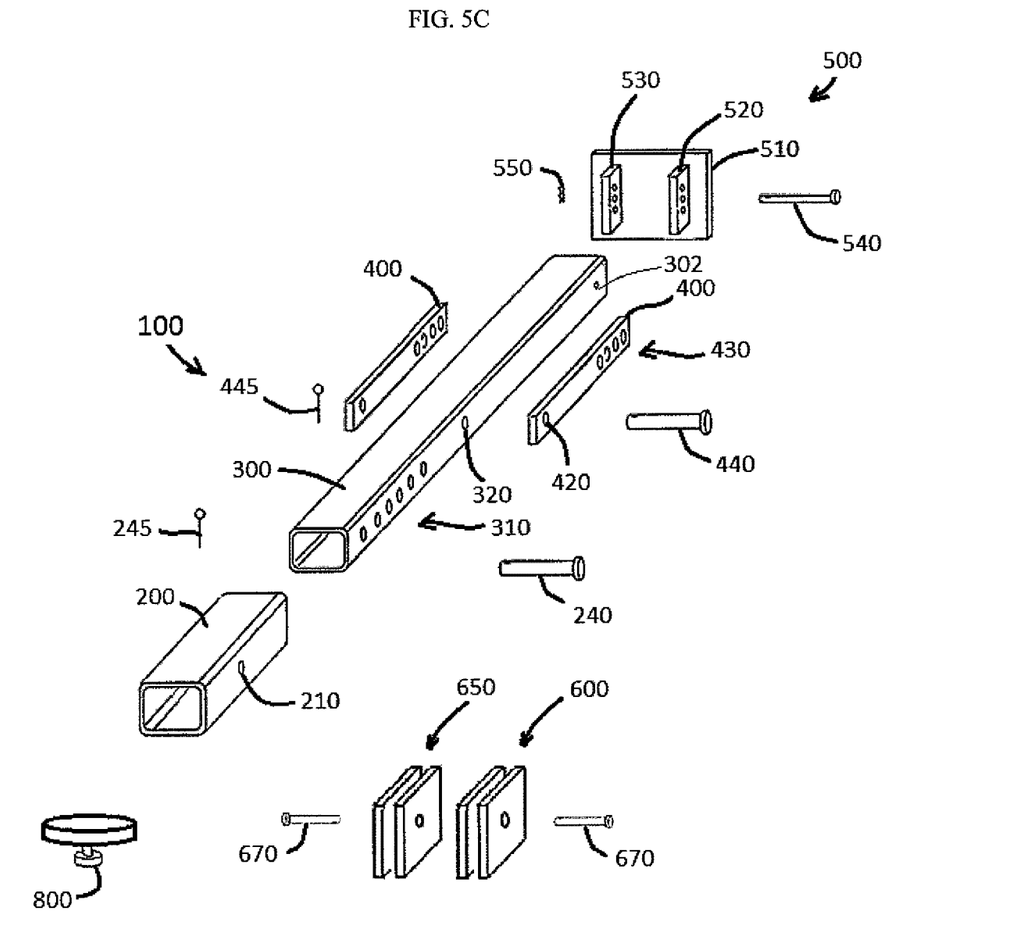
FIG. 5C is an exploded view of the restraining device in accordance with example embodiments.

FIGS. 5A-5B are views of a restraining device 1000 in accordance with example embodiments. FIG. 5C is an exploded view of the restraining device 1000 in accordance with example embodiments. As shown in FIGS. 5A-5C, the restraining device 1000 may include a boom 100 having a pin connected portion 102 and an end 104 fitted with a coupling structure 800. In example embodiments the coupling structure 800 may resemble the kingpin 80 described in the background section, however, the invention is not limited thereto as there are various kingpins available in the market place which may be suitably used in example embodiments. Furthermore, the coupling structure 800 may be a structure other than a kingpin. For example, the coupling structure 800 may have another form such as, but not limited to, a cylinder or a cylinder with a flanged end. In the event the first coupling structure 800 is a kingpin, the king pin may be attached to the boom 100 in any number of ways including, but not limited to, welding, pinning, clipping, and or bolting.

In example embodiments the boom 100 may be configured as a telescoping structure. For example, in example embodiments the boom 100 may include a first telescoping member 200 and a second telescoping member 300. In this application, telescoping members are members wherein one member is configured to move along the second member. For example, in example embodiments, the first telescoping member 200 may be formed from 8×8×½" tube steel and the second telescoping member 300 may be formed from 7×7×½" tube steel. As such, the second telescoping member 300 may be inserted into the first telescoping member 200 as shown in FIG. 5A in a manner that allows the first telescoping member 200 to slide along the outside of the second telescoping member 300. This however, is not meant to be a limiting feature of the invention. For example, in example embodiments, the second telescoping member 300 may be formed of 8×8×½" tube steel and the first telescoping member 200 may be formed from 7×7×½" tube steel such that the first telescoping member 200 may be inserted into the second telescoping member 300.

Although example embodiments describe the first and/or second telescoping members 200 and 300 as being fabricated from 8×8×½" tube steel or 7×7×½" tube steel, the invention is not limited thereto. For example, either one of the first and/or second telescoping members 200 and 300 may be fabricated from a variety of steel sizes having various thicknesses including, but not limited to, 2×2×¼" tube steel, 4×4×½" tube steel, 2×4×¼" tube steel, 6×6×⅜" tube steel, 8×8×¼" tube steel, 8×4×¼" tube steel, and/or 10×10×1" tube steel. In addition, the telescoping members 200 and 300 are not required to be fabricated from steel. For example, the telescoping members 200 and 300 may be formed another metal such as, but not limited to, aluminum, or may be formed from a different material such as a composite material. Further yet, the first and second telescoping members 200 and 300 are not required to made from structural tubes. For example, the first and second telescoping members 200 and 300, rather than being made from tube steel, may alternatively be made from open members such as I-beams, H-beams, angle iron, or channel iron.

In example embodiments, the restraining device 1000 may have the first end 102 thereof attached to a building structure, for example, a wall, via a bracket 500. As shown in FIGS. 5A-5C, the bracket 500 may have a base plate 510 with a first plate 520 and a second plate 530 attached thereto. The first and second plates 520 and 530 may be spaced apart to accommodate the second telescoping member 300 so that the second telescoping member 300 may pivot therein. In example embodiments, each of the first and second plates 520 and 530 may include at least one hole to accommodate a pin 540 which may be used to pin connect the second telescoping member 300 to the bracket 500. For example, as shown in at least FIG. 5C, the second telescoping member 300 may include a hole 302 which may be aligned with holes provided in the first and second plates 520 and 530 and a pin 540 may be inserted into a hole of the first plate 510, through the second telescoping member 300 through hole 302 and through a hole of the second plate 530. A cotter pin 550 may be inserted into the pin 540 to ensure the pin 540 cannot move back through the holes of the first and second plates 520 and 530 and the holes of the second telescoping member 300.

In example embodiments, the bracket 500 may be attached to a building structure, for example, a concrete wall, by a conventional means. For example, the bracket 500 may be attached to concrete wall using anchor bolts. On the other hand, the bracket 500 may be part of an embedded plate embedded in a concrete wall as the concrete wall is formed. The use of a bracket 500, however, is not a critical aspect of the restraining device 1000. For example, rather than pin connecting the boom 100 to a bracket 500, the first and second plates 520 and 530 may be welded to an existing steel structure, for example, an exposed I-beam. Thus, although example embodiments illustrate the restraining device 1000 as including a bracket 500 configured to attach the boom 100 to a building structure, the bracket 500 may be omitted.

Referring to FIG. 5C, the first telescoping member 200 may include a first hole 210 and the second telescoping member 300 may include a plurality of holes 310. Although FIG. 5C illustrates only one side (the right side) of the first and second telescoping members 200 and 300 as having the holes 210 and 310, it is understood that comparable holes are formed on other side (left side) of the first and second telescoping members 200 and 300.

In example embodiments, the first telescoping member 200 may be moved along the second telescoping member 300 in a manner that allows the hole 210 of the first telescoping member 200 to align with one of the holes 310 of the second telescoping member 300. In example embodiments, a pin 240 may be used to secure a position of the first telescoping member 200 with respect to the second telescoping member 300 by passing the pin 240 through the first hole 210 and at least one of the holes 310 of the second telescoping member 300 with which it is aligned (as well as passing the pin through the corresponding holes on the left side of the telescoping members 200 and 300). Because there are a plurality of holes provided in the second telescoping member 300, the first telescoping member 200 may be fixed at various positions along a length of the second telescoping member 300. As such, the boom 100 may have a variable length. In example embodiments, the pin 240 may be retained in the holes 210 and 310 via a cotter pin 245.

In example embodiments, the restraining device 1000 may further include a pair of retaining arms 400 arranged at sides of the second telescoping member 300. In example embodiments, the retaining arms 400 may resemble bars and or tubes pin-connected to the second telescoping member 300 by a pin 440 which itself may be secured in place by a cotter pin 445. For example, the arms may include holes 420 arranged at ends thereof which may be aligned with holes 320 provided in the second telescoping member 300 and the pin 440 may pass through the holes 420 of the arms as well as the holes 320 of the second telescoping member 300.

The arms 400 may be configured to rotate between two pairs of plate 600 and 650 as shown in FIG. 5B and may be connected to the pairs of plates 600 and 650 by pins 670. In example embodiments, distal ends of the arms 400 may include a plurality of holes 430 to allow for some adjustability in connecting the arms to the pairs of plate 600 and 650. In example embodiments, the pairs of plates 600 and 650 may attach to a floor structure. For example, each of the pairs of plates 600 an 650 may attached to an anchor plate which is attached to a floor via anchor bolts. Because such floor attachments are common in the art, a description thereof is omitted for the sake of brevity.

Figure 6A:
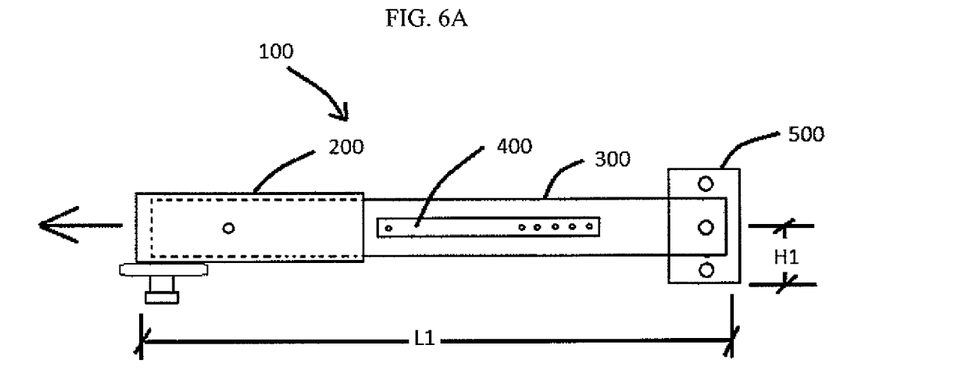
FIGS. 6A-6C are side views of the restraining device in accordance with example embodiments.
Figure 6B:
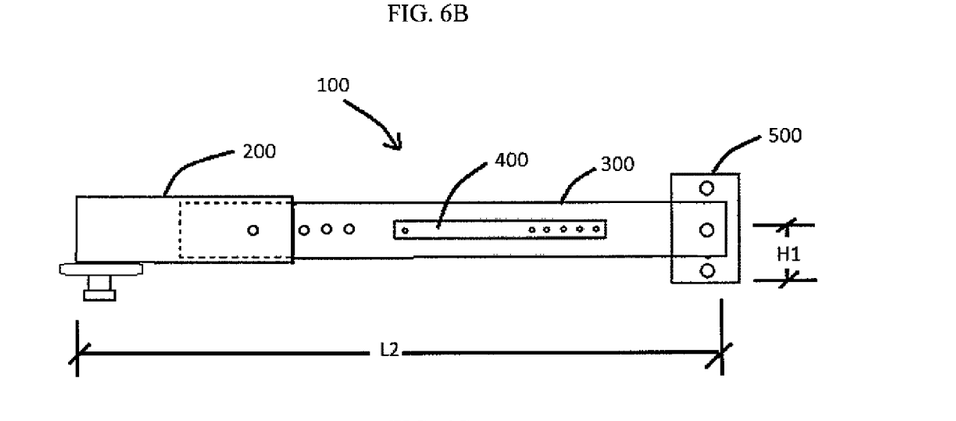
Figure 6C:
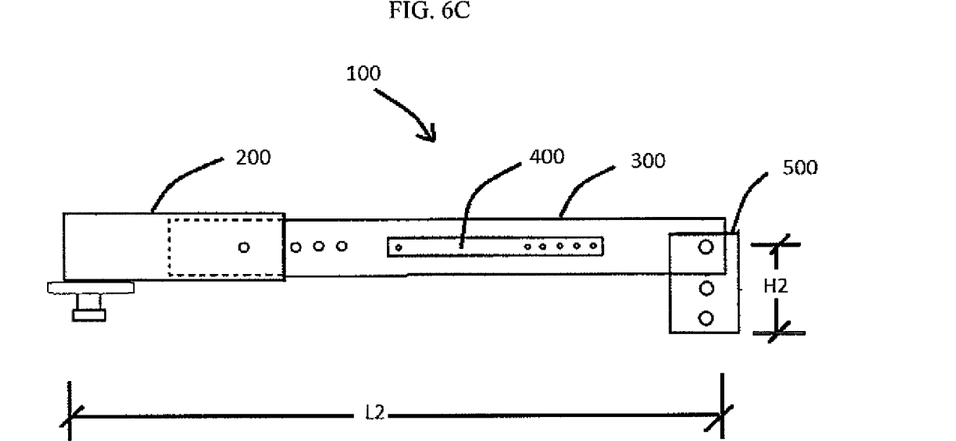
Figure 7A:
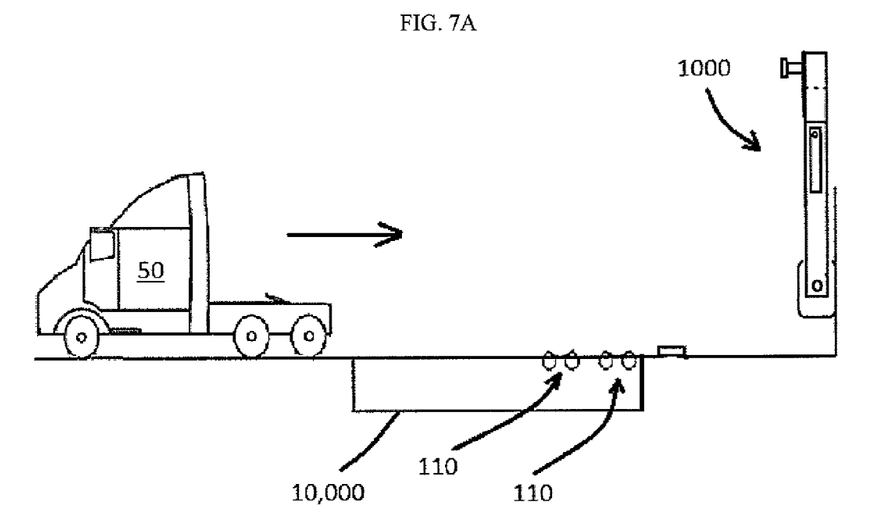
FIGS. 7A-7E illustrate steps of testing a conventional vehicle using the restraining device in accordance with example embodiments.
Figure 7B:
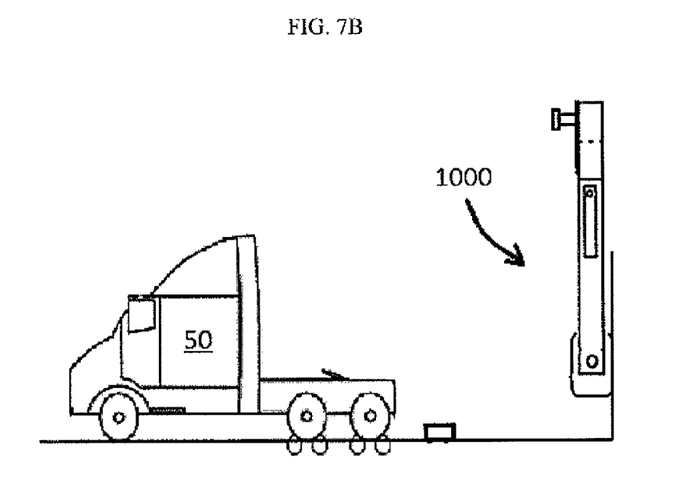
Figure 7C:
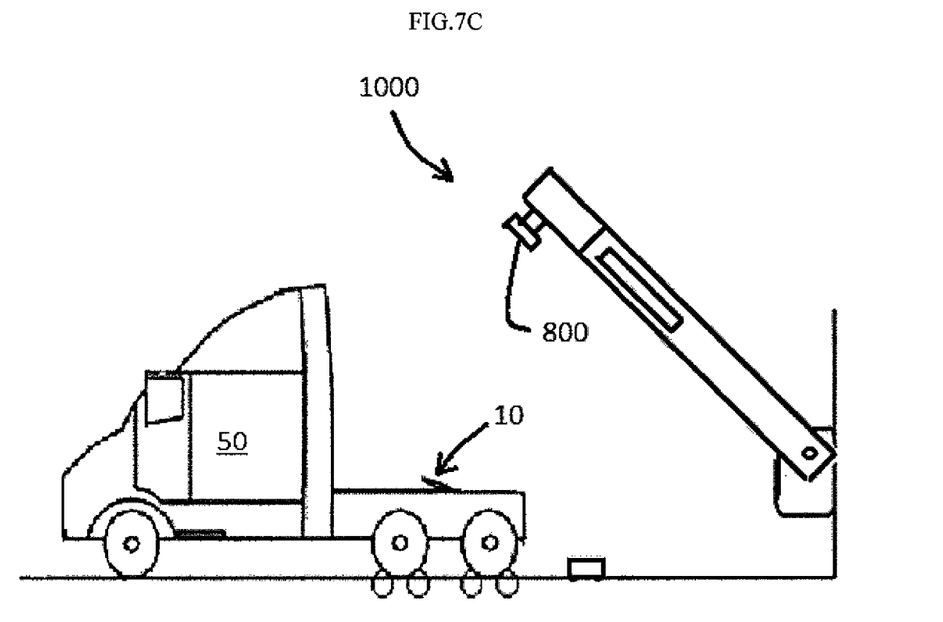
Figure 7D:
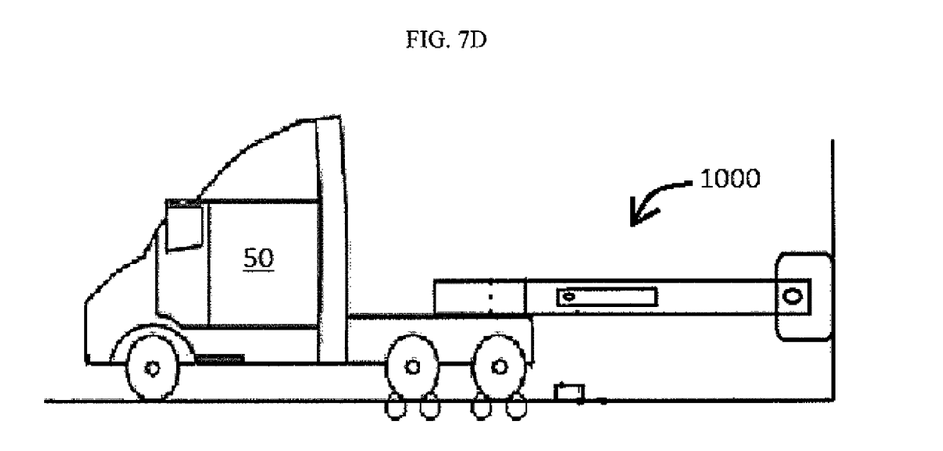
Figure 7E:
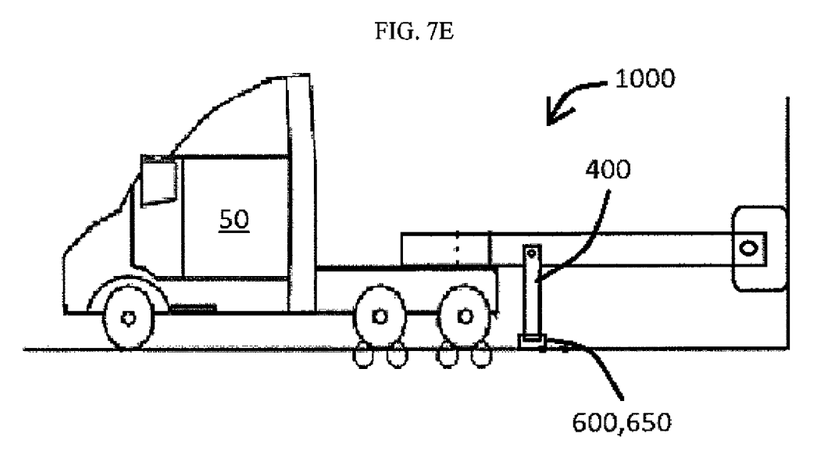

FIGS. 6A-6C illustrate various configurations of the restraining device 1000. In FIG. 6A, for example, the boom 100 is shown as being pivotally attached to the bracket 500. In this example, the pin 540 secures the boom 100 to the bracket via middle holes arranged in the first and second plates 520 and 530. Thus, the boom 100 is at a first height H1 controlled by the attachment of the boom 100 to the middle holes of the first and second plates 520 and 530. In FIG. 6A the first telescoping member 200 is shown in a first position with respect to the second telescoping member 300. Thus, FIG. 6A shows the boom 100 having a first length L1. In FIG. 6B, however the first telescoping member 200 is moved along a length of the second telescoping member 300 to assume a second position with respect to the second telescoping member 300. Thus, FIG. 6B illustrates the boom 100 having a second length L2. In FIG. 6C the attachment point for the boom 100 with respect to the bracket 500 is changed by moving the boom 100 upwards so that the first end 102 of the boom 100 may attach to the bracket via the upper holes of the first and second plates 520 and 530. As such, FIG. 6C illustrates the boom 100 may have a second height H2.

Thus far, example embodiments illustrate a restraining device 1000 having a variable length boom 100 also having the ability to operate at different elevations. The boom is pin-connected at a first end 102 and has a coupling structure 800 arranged at a second end 104. In example embodiments, as will be shown shortly, the restraining device 1000 is particularly well suited to restrain a truck having a fifth wheel, during a dyno test.

FIG. 7 illustrates a dyno room having a dynamometer 10,000 installed under a floor thereof. Consistent with the prior art, the dynamometer 10,000 includes rollers 110 upon which truck tires may engage. In example embodiments, the restraining device 1000 may be attached to a wall of the dyno room. In example embodiments, a truck 50 may be backed over the rollers 110 of the dyno 10,000 as shown in FIG. 7B. At this stage the restraining device 1000 may be rotated downwards as shown in 7C until the second end of the boom with the coupling structure 800 is near the fifth wheel 10 of the truck 50. Because the boom 100 is capable of variable length, the second end 104 of the boom 100 carrying the coupling structure 800 may be moved to engage the coupling structure 800 with the fifth wheel 10 of the truck 50 as shown in FIG. 7D. For example, the first telescoping member 200 may be moved towards the fifth wheel 10 of the truck 50. Once engaged, the pin 240 may be inserted into the hole 210 and one of the holes 310 to prevent further movement of the first telescoping member 200 with respect to the second telescoping member 300. After a length of the boom 100 is fixed by the pin 240, the arms 400 may be rotated downwards to engage the pairs of plates 600 and 650 as shown in FIG. 7E. Once the arms 400 are attached to the pairs of plate 600 and 650, the truck 50 is fully restrained by the restraining device 1000. The arms 400, for example, prevent upward motion of the truck while the boom 100 prevents a forward or rearward movement of the truck 50. As such, the restraining device 1000 of example embodiments allows for a quick and safe manner to secure a truck 50 to a dyno 10,000 without the use of belts and/or chains.

Figure 8:
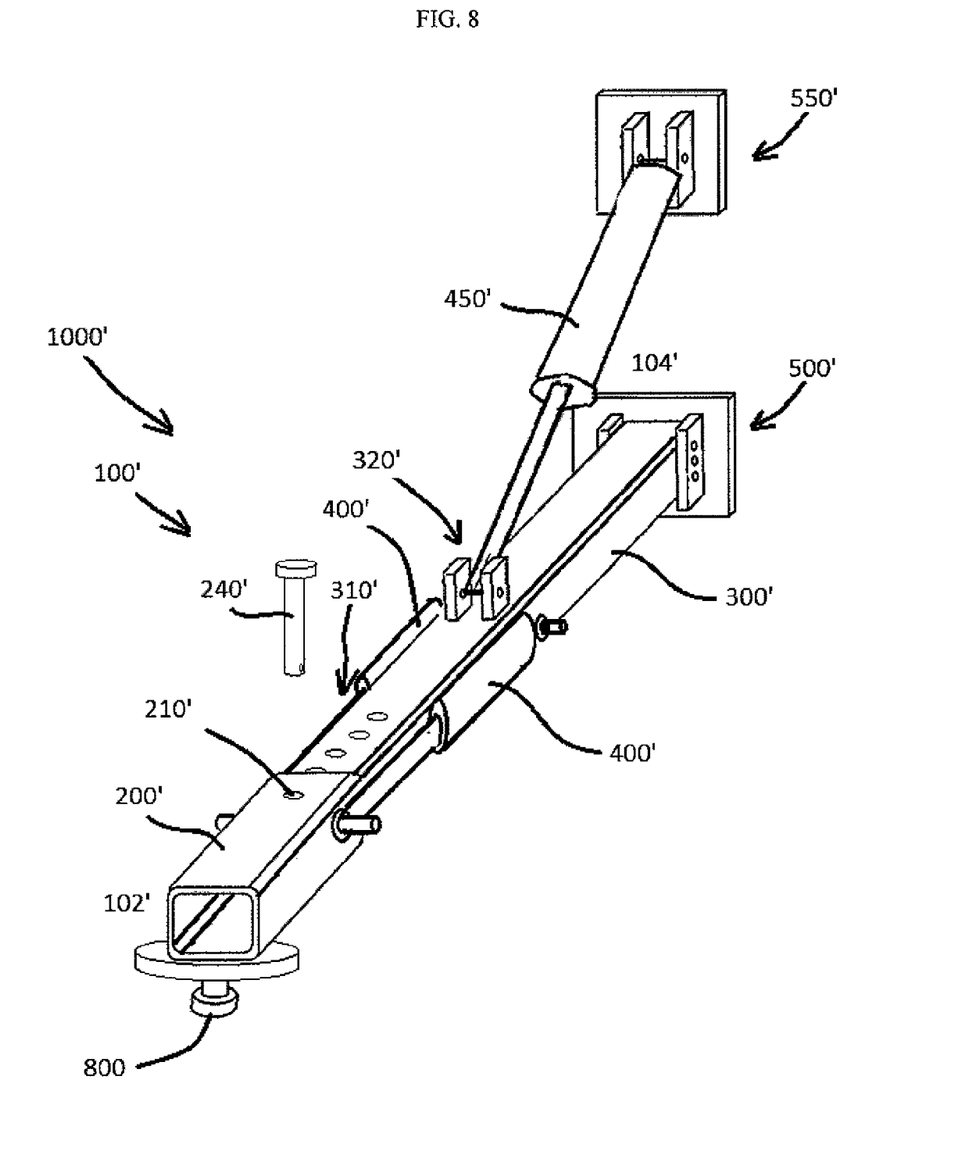
FIG. 8 is a perspective view of another restraining device in accordance with example embodiments.

FIG. 8 is another example of a restraining device 1000' in accordance with example embodiments. The restraining device 1000' may be somewhat similar to the restraining device 1000. For example, the restraining device 1000' may include an adjustable boom 100' similar to the boom 100, a bracket 500' similar to the bracket 500, and a connecting structure 800. The boom 100' may include a first and a second telescoping member 200' and 300' similar to the first and second telescoping members 200 and 300. However, there are some differences which are highlighted below.

In example embodiments, the restraining device 1000' may include a first actuator 400' and a second actuator 450' In example embodiments, the first actuator 400' may have one end connected to the first telescoping member 200' and a second end connected to the second telescoping member 300'. The first actuator 400' may be, but is not required to be, a pneumatic or hydraulic cylinder, but may be another type of actuator such as a screw type actuator or an electric actuator. In example embodiments, the first actuator 400', when operated, may cause the first telescoping member 200' to move along the second telescoping member 300. For example, in the event the first telescoping member 200' is a hydraulic cylinder, a barrel of the hydraulic cylinder may attach to the second telescoping member 300' and a rod of the hydraulic cylinder may attach to the first telescoping member 100'. Thus, operating the hydraulic cylinder may cause the first telescoping member 200' to move with respect to the second telescoping member 300'. As such, an operator may easily modify a length of the boom 100' by controlling the first actuator 400'.

In example embodiments, each of the first and second telescoping members 200' and 300' may include at least one hole. For example, the first telescoping member 200' may include a first hole 210' and the second telescoping member 300' may include a plurality of holes 310'. As the first telescoping 200' member is moved along the second telescoping member 300', the hole 210' of the first telescoping member 210' may lie over one of the holes 310' of the second telescoping member 300'. In the event the hole 210' of the first telescoping member 200' overlies a hole of the second telescoping member 300', a pin 240' may be inserted in the holes to lock the first telescoping member 200' to the second telescoping member 300. Because there are several holes in the second telescoping member 300', the first telescoping member 200' may be locked in several locations with respect to the second telescoping member 200'.

Although FIG. 8 illustrates the restraining device 1000' as including a first telescoping member 200' having a first hole 210' and a second telescoping member 300' having a plurality of holes 310', the invention is not limited thereto. For example, in example embodiments, the first telescoping member 200' may have a plurality of holes rather than a single hole. In addition, because the first actuator 400' may be configured to maintain the first telescoping member 200' in a position relative to the second telescoping member 300', the holes 210' and 310' may be omitted in their entirety.

In FIG. 8, the restraining device 1000' is also illustrated as including a second actuator 450'. In example embodiments, the second actuator 450' may be pin connected to the second telescoping member 300' as well as being pin connected to a bracket 550'. The bracket 550' may be configured to attach the second actuator 450' to a wall, for example, a wall of a building, or some other structure. In example embodiments, the second actuator 450' may alternatively directly connect to another structure, thus, the second bracket 550' may be omitted from the restraining device 1000'.

Figure 9A:
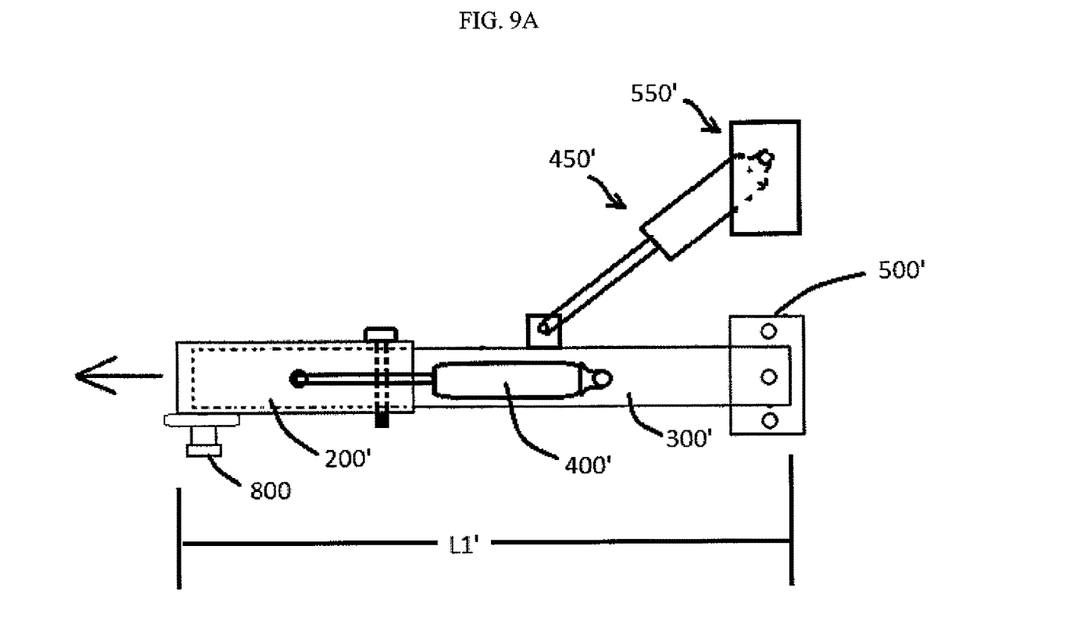
FIGS. 9A-9C are side views of the restraining device in accordance with example embodiments.
Figure 9B:
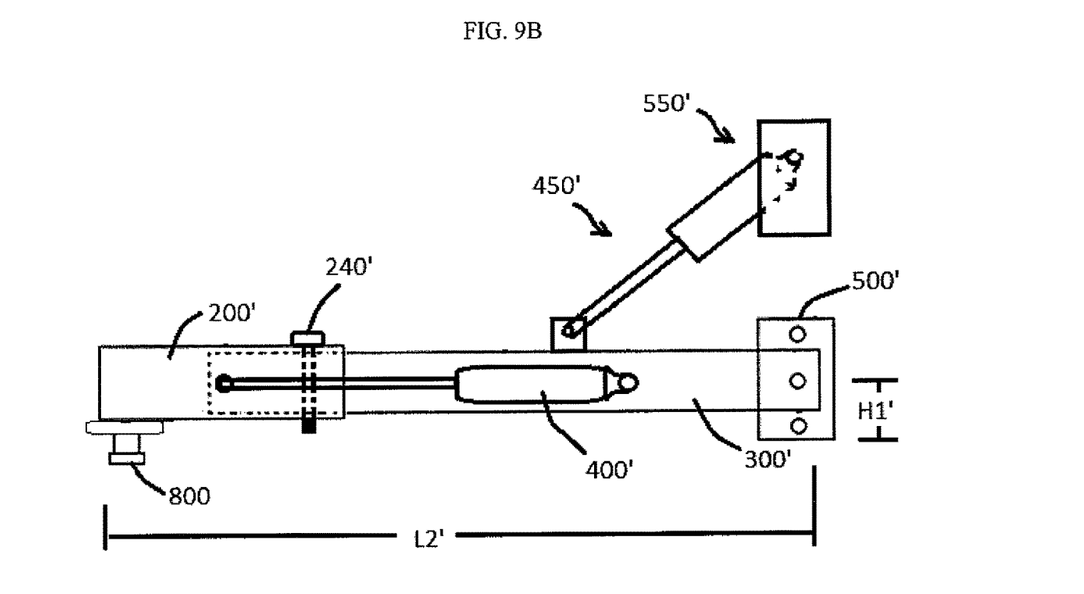
Figure 9C:
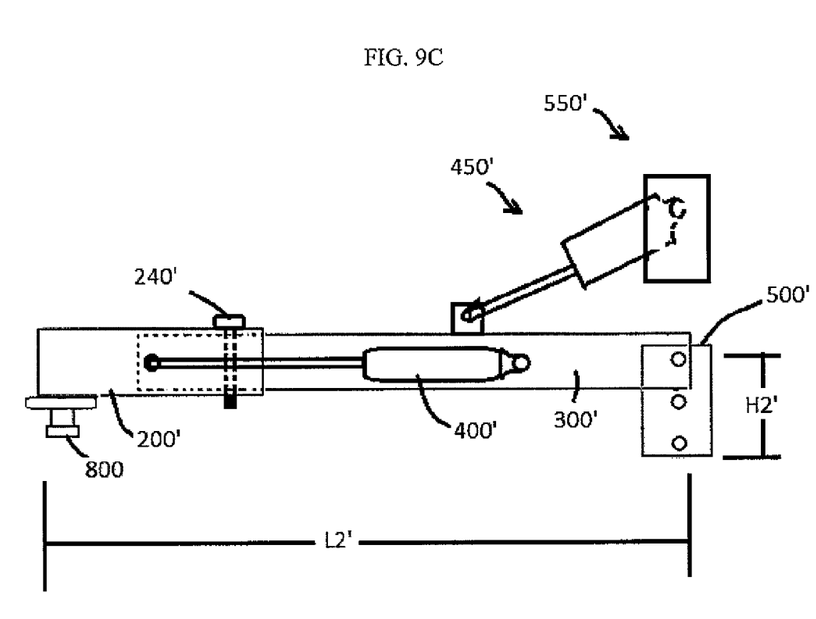

FIGS. 9A-9C illustrate various configurations of the restraining device 1000'. In FIG. 9A, for example, the boom 100' is shown as being pivotally attached to the bracket 500'. In this example, the pin 540' secures the boom 100' to the bracket 500' via middle holes arranged in the first and second plates of the bracket 500'. Thus, the boom 100' is at a first height H1' controlled by the attachment of the boom 100' to the middle holes of the bracket 500'. In FIG. 9A the first telescoping member 200' is shown in a first position with respect to the second telescoping member 300'. Thus, FIG. 9A shows the boom 100' having a first length L1'. In FIG. 9B, however the first telescoping member 200 is moved along a length of the second telescoping member 300 to assume a second position with respect to the second telescoping member 300. Such a movement may be caused by operation of the first actuator 400'. Thus, FIG. 9B illustrates the boom 100' having a second length L2'. In FIG. 9C the attachment point for the boom 100' with respect to the bracket 500' may be is by moving the boom 100' upwards so that the first end 102' of the boom 100' may attach to the bracket 500' via the bracket's upper holes. As such, FIG. 9C illustrates the boom 100' may have a second height H2'.

Thus far, example embodiments illustrate a restraining device 1000' having a variable length boom 100' also having the ability to operate at different elevations. The boom is pin-connected at a first end 102' and has a coupling structure 800' arranged at a second end 104'. In example embodiments, as will be shown shortly, the restraining device 1000' is particularly well suited to restrain a truck having a fifth wheel, during a dyno test.

Figure 10A:
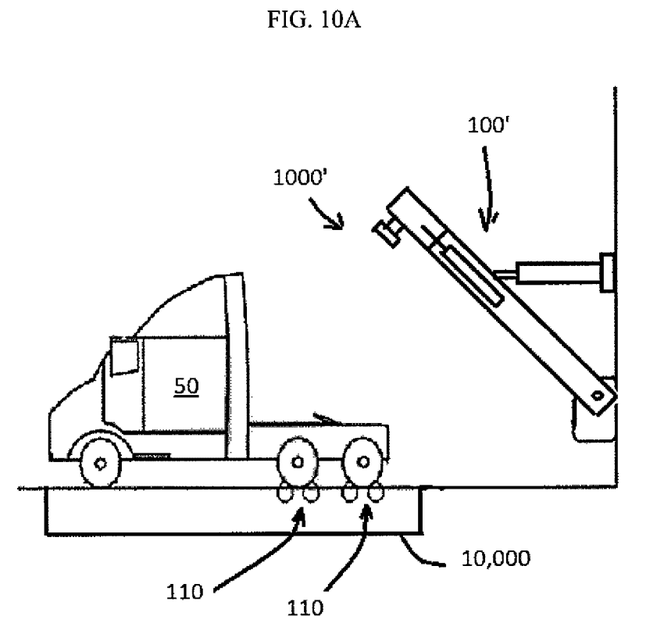
FIGS. 10A-10B illustrate steps associated with testing a vehicle in accordance with example embodiments.
Figure 10B:
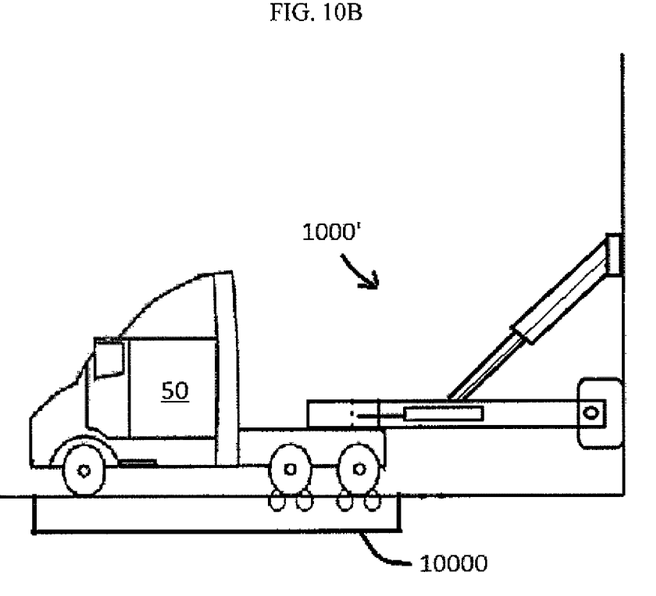

FIG. 10A illustrates a dyno room having a dynamometer 10,000 installed under a floor thereof. Consistent with the prior art, the dynamometer 10,000 includes rollers 110 upon which truck tires may engage. In example embodiments, the restraining device 1000' may be attached to a wall of the dyno room as shown in FIG. 10A. For example, holes may be drilled into the base plates of the brackets 500' and 550' and the brackets 500' and 550' may be secured to the wall via anchor bolts. In example embodiments, a truck 500 may be backed over or near the rollers 110 of the dyno 10,000. At this stage the boom 100' of the restraining device 1000' may be rotated downwards under the influence of the second actuator 450' to arrange the coupling structure 800 near the fifth wheel 10 of the truck 50. Because the boom 100' is capable of variable length, the second end 104' of the boom 100' carrying the coupling structure 800 may be moved to engage the coupling structure 800 with the fifth wheel 10 of the truck 50 as shown in FIG. 10B. As explained earlier, the second end 104' may be moved towards to fifth wheel 10 by operating the first actuator 400'. Once engaged, the first actuator 400' may be operated to align holes 210' of the first telescoping member 200' with one of the holes 310' of the second telescoping member 300'. Once aligned the pin 240' may be inserted into the holes 210' and 310' to prevent further movement of the first telescoping member 200' with respect to the second telescoping member 300'. At this point the truck 50 is fully restrained by the restraining device 1000.' The second actuator 450', for example, prevents upward motion of the truck 50 while the boom 100' prevents a forward or rearward movement of the truck 50. In fact, in operation, the second actuator 450' may apply a downward force on the truck 50 to ensure the truck 50 does not slip off of the rollers 110. As such, the restraining device 1000' of example embodiments allows for a quick and safe manner to secure a truck 50 to a dyno 10,000 without the use of belts and/or chains.

It should be pointed out the restraining device 1000' of example embodiments may be formed without the holes 210' and 310' and the movement of the of the first telescoping member 200' with respect to the second telescoping member 300' may be entirely controlled by the first actuator 400'. For example, the first actuator 400' may be configured to prevent any movement between the first and second telescoping members 200' and 300' in addition to being configured to move the first telescoping member 200' with respect to the second telescoping member 300'. As such, the first actuator 400' may cause the boom 100' to behave as a rigid structure. Also, in example embodiments, in the event the first and second telescoping members 200' and 300' are not secured to each other by a pin 240', and the coupling structure 800 is engaged with the fifth wheel 10 of the truck 50, the first actuator 400' may be operated to move the truck back over the rollers 110 in the event the truck has slipped off of the rollers 110.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What is claimed is:

1. A method of testing a truck having a fifth wheel, the method comprising:
    moving the truck onto a dynamometer;
    inserting a kingpin into the fifth wheel of the truck; and
    performing a test while the truck is on the dynamometer, wherein the kingpin is attached to a telescoping boom and the telescoping boom is configured to prevent the truck from moving forward and backwards during the test.

2. The method of claim 1, wherein the test uses the dynamometer.

3. The method of claim 1, further comprising:
    extending the telescoping boom by operating a first actuator.

4. The method of claim 3, wherein moving the kingpin towards the fifth wheel by operating the first actuator includes changing a length of the telescoping boom.

5. The method of claim 3, further comprising:
    exerting a downward force on the fifth wheel by operating a second actuator.

6. The method of claim 3, further comprising:
    moving the truck using the first actuator to secure the truck onto rollers of the dynamometer.

7. The method of claim 1, further comprising:
    locking a first telescoping member of the telescoping boom to a second telescoping member of the telescoping boom by passing a pin through the first and second telescoping members.

8. An apparatus comprising:
    a telescoping boom having a pin connection;
    a first actuator configured to extend the telescoping boom;
    a second actuator configured to rotate the telescoping boom; and
    a kingpin rigidly attached to the telescoping boom, the kingpin being configured to couple to a fifth wheel of a vehicle, wherein the telescoping boom is configured to prevent the vehicle from moving forwards and backwards while the vehicle is on a dynamometer.

9. The apparatus of claim 8, wherein the boom includes a first telescoping member and a second telescoping member and the kingpin is arranged on the first telescoping member.

10. The apparatus of claim 9, wherein the first actuator configured to move the first telescoping member with respect to the second telescoping member.

11. The apparatus of claim 10, wherein the second actuator is pin connected to one of the first telescoping member and the second telescoping member.

12. The apparatus of claim 11, wherein the first and second actuators are hydraulic cylinders.

13. The apparatus of claim 9, wherein one of the first telescoping member and the second telescoping member includes a plurality of apertures configured to align with at least one aperture of the other of the first and second telescoping members as the first telescoping member is moved with respect to the second telescoping member.

14. The apparatus of claim 13, further comprising:
    a pin configured to insert into the one of the plurality of apertures of the one of the first and second telescoping members and the at least one aperture of the other of the first and second telescoping members to prevent the first and second telescoping members from moving with respect to each other.

15. The apparatus of claim 8, wherein the first and second telescoping members comprise structural tubes.

16. The apparatus of claim 15 wherein the first telescoping member at least partially encloses the second telescoping member.

* * * * *